United States Patent
Youngerman et al.

(10) Patent No.: US 6,231,449 B1
(45) Date of Patent: May 15, 2001

(54) TORSIONAL VIBRATION COUPLING

(75) Inventors: Michael S. Youngerman, Troy; Donald D. Pippel, Pleasant Ridge, both of MI (US)

(73) Assignee: Torsional Control Products, Inc., Troy, MI (US)

( * ) Notice: Subject to any disclaimer, the term of this patent is extended or adjusted under 35 U.S.C. 154(b) by 0 days.

(21) Appl. No.: 09/326,860

(22) Filed: Jun. 7, 1999

(51) Int. Cl.⁷ ..................................................... F16D 3/12
(52) U.S. Cl. ................ 464/63; 464/61; 464/62; 464/66; 464/68; 192/212
(58) Field of Search .................. 464/61, 62, 63, 464/66, 68; 192/203, 205, 212

(56) References Cited

U.S. PATENT DOCUMENTS

| | | | |
|---|---|---|---|
| 4,789,375 | * 12/1988 | Bassett | 464/68 |
| 4,884,996 | * 12/1989 | Schmitt et al. | 464/68 |
| 5,146,811 | 9/1992 | Jackel . | |
| 5,289,737 | * 3/1994 | Kuhne | 74/574 |
| 5,505,288 | * 4/1996 | Tomiyama et al. | 464/66 |
| 5,595,276 | 1/1997 | Memmel . | |
| 5,598,745 | * 2/1997 | Tsuchiya | 74/574 |
| 5,681,221 | 10/1997 | Albers et al. . | |
| 5,682,972 | 11/1997 | Sasada . | |
| 5,687,828 | 11/1997 | Ament et al. . | |
| 5,711,407 | 1/1998 | Maier . | |
| 5,769,722 | 6/1998 | Uehara . | |
| 5,800,270 | * 9/1998 | Uenohara et al. | 464/68 |

FOREIGN PATENT DOCUMENTS 58-221040 * 12/1983 (JP) ........................................ 464/68

* cited by examiner

*Primary Examiner*—Lynne H. Browne
*Assistant Examiner*—Aaron M Dunwoody

(57) ABSTRACT

An apparatus for damping vibrations between the torque producing device and the transmission of torque has a member having a pair of generally parallel plates with a spacer bar disposed between the plates, and an output member disposed between the plates. The input and output members are angularly movable with each other about a common axis and relative to each other from neutral positions. A torsional damping member is disposed between the input and output members, the torsional damping members being in contact with the spacer bar and enclosed within an annular chamber formed between the input and output members.

18 Claims, 4 Drawing Sheets

SECTION A - A

SECTION A - A

SECTION B - B

TORSIONAL VIBRATION COUPLING

BACKGROUND AND SUMMARY OF THE INVENTION

The present invention relates to substantially flange like rotary components which can be utilized for the reduction of torsional stresses or vibrations in drive trains. The device contains energy storing devices composed of coil springs which serve to transmit torque between a rotary input and an output member forming part of a torsional vibration coupling for use in the powertrain between the prime mover (such as a combustion engine or other torque producing element) and the variable speed transmission and/or another driven unit. More particularly, the invention relates to improvement in the substantially flange like rotary components which are especially suitable for the transmission of torque to or from coil springs which together form an annular energy absorbing device interposed between coaxial input and output members which can rotate about a common axis.

It is well known to employ annular energy absorbing devices of the above outlined character. A first flange is rotatably coupled to and driven by a torque producing element when the mechanism employing such structure is engaged. A second flange is rotatably coupled to the transmission or drive train of the mechanism. The parallel first and second flanges are coupled by energy absorbing devices such as springs disposed between the flanges. The flanges are angularly movable with each other about a common axis and relative to each other about neutral positions.

In situations where the first and second flanges are rotating at the same speed, the spring is in a neutral position. When a torque load is applied to either the input or the output shaft, the relative angular rotation speed or velocity is changed. The plates, while still rotating, will move away from the neutral position compressing the springs and transmitting the load to the other member. The coupling acts to reduce the "shock" between the torque producing and the torque transmitting members.

It is known that due to the stresses seen in the vibration damping apparatus as described above, certain failure modes are observed. These failure modes include wear of the spring components, as well as a substantial amount of wear in the chambers holding these components. This wear reduces the efficiency and durability of the springs and holding chambers and lead to noise, as well as the potential of catastrophic failure of the internal components.

As such, the invention described herein is embodied in an apparatus for dampening vibrations in a powertrain between a torque producing and a torque transmission assembly. The improved apparatus comprises at least two components which are rotatable relative to each other about a common axis and include a first component connectable with the torque producing elements (e.g. with the crankshaft of an internal combustion engine) and a second component which is connectable with the torque transmission assembly (e.g. with the input shaft of a variable speed transmission), and means for transmitting torque between the first and second components. Included within the apparatus is a chamber and/or chambers for holding the spring elements. These chambers are located between the input element and the output element of the apparatus; more particularly, between the input element and the spacer ring of the output element. The apparatus contains with the chambers torsionally elastic dampers or springs. In some instances it may be desirable to include friction materials between the flange members to help dampen vibrations by providing hysteresis or Coulomb friction within the torsional vibration coupling. It has been found that the aforementioned configuration significantly reduces the amount of wear on the spring and flange members of the apparatus.

An optional ledge portion can be provided for separating a portion of the torsional damping member from the spacer ring. This allows contact between the spring and the spacer bar element where there is the minimum translation and/or relative motion of the coupling member, thus reducing wear.

In view of the aforementioned problems, it is an object of the current invention to provide a torsional vibration coupling which reduces the amount of wear on its components.

It is another object of the current invention to provide a torsional vibration coupling which has a reduction in variation of uncontrolled hysterisis.

It is another object of the current invention to provide a torsional vibration coupling where changes in the damping rate during the life of the product is minimized.

It is further an object of the current invention to provide a torsional vibration coupling which is less susceptible to corrosion and which requires less frequent lubrication of its elements.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding these drawings only depict preferred embodiments of the present invention and are not, therefore, to be considered limiting in scope, the invention will be described and explained with additional specificity and detail through the use of the accompanying drawings, in which.

DETAILED DESCRIPTION OF THE PREFERRED EMBODIMENTS

Figure 1B:
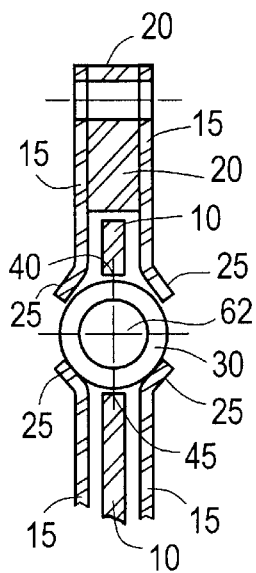
FIGS. 1a and 1b depict torsional coupling members as known in the prior art.
Figure 1A:
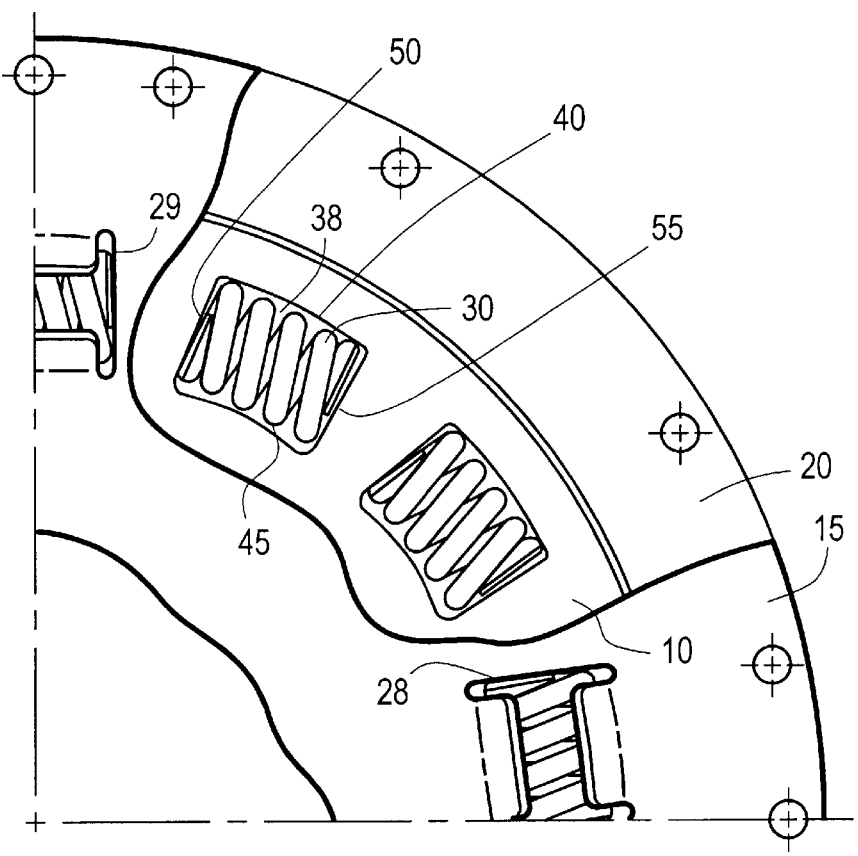

FIG. 1a depicts a torsional vibration coupling as known in the prior art. Depicted is a cut-away view of a torsional vibration coupling having an output flange 10 and a pair of input flanges 15 being spaced apart by spacer 20. Output flange 10 has a slot 38 which houses a spring 30. Input flanges 15 have a pair of holding flanges 25, a forward bearing surface 28, and an aft bearing surface 29, disposed next to slot 38 for holding spring 30. Slot 38 has a slot forward wall 50, a slot top wall 40, a slot aft wall 55, and a slot bottom wall 45. A torsional damping member in the form of a spring 30 is compressed between the forward bearing surface 28 and slot aft wall 55 and applies force to the flanges whenever rotation velocity between the output flange 10 and the input flanges 15.

Figure 2B:
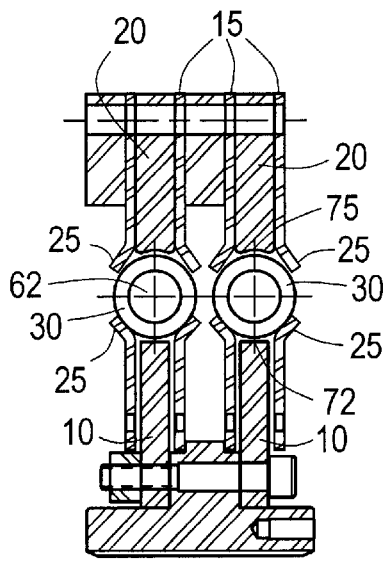
FIGS. 2a and 2b depict a torsional coupling of the present invention.
Figure 2A:
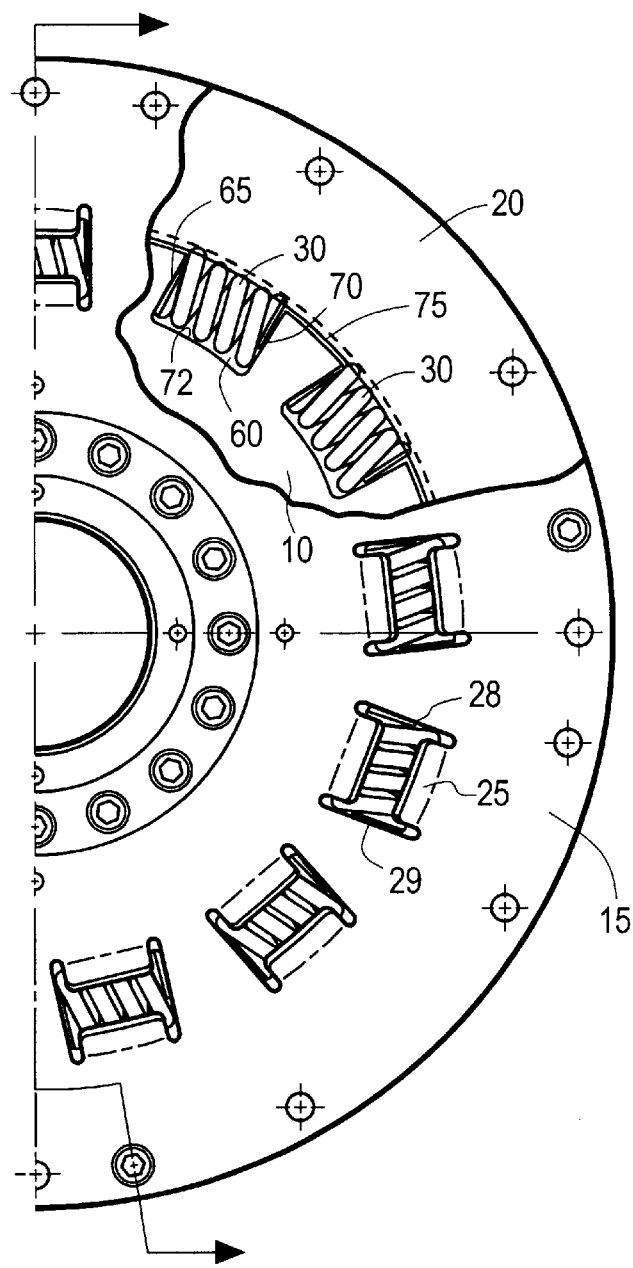

Depicted in FIG. 2a is a side view of a cut-away section of a torsional coupling of the preferred embodiment. The torsional coupling has at least one output flange 10 and at least one pair of parallel input flanges 15 separated by a spacer ring 20. The output flange 10 which is coupled to a hub portion 11 is annularly surrounded by the spacer 20, having a plurality of channels 60. The channel has a forward wall 65, an aft wall 70, and a bottom wall 72. The spacer 20 has a spacer bearing surface 75 disposed adjacent the output flange 10. A cavity is formed by channel 60 and spacer bearing surface 75. Input flanges 15 have a plurality of holding flanges 25 disposed about the channel 60 further defining a volume 62 therein.

Spring 30 is disposed within the channel 60 or volume 62 for transmitting torque between the input and output members. It should be noted that the present embodiment allows for a transmission of rotational energies in the fore and aft direction. It should be further noted that whereas a single output flange 10 can be coupled to a pair of input flanges 15, a plurality of such arrangements is also functional as depicted in FIG. 2b. Further depicted in FIG. 2b the spacer bearing surface 75 is shown and a curved groove disposed thereon. Spacer bearing surface 75 functions to reduce the amount of wear on spring 30 by reducing the amount of relative movement of spring 30 with respect to channel 60. The radius of the groove preferably is the outside diameter of spring 30. While this is the preferred surface structure, it should be noted that other surfaces, such as flat, will also function. The curved surface reduces the contact stress between the springs and the spaces by increasing the contact surface area, thereby increasing the component's life.

Figure 3B:
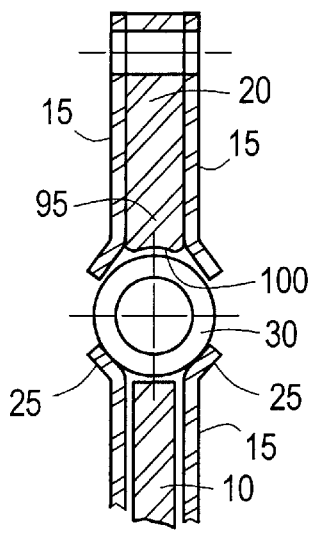
FIGS. 3a–3d depict another embodiment of the current invention.
Figure 3C:
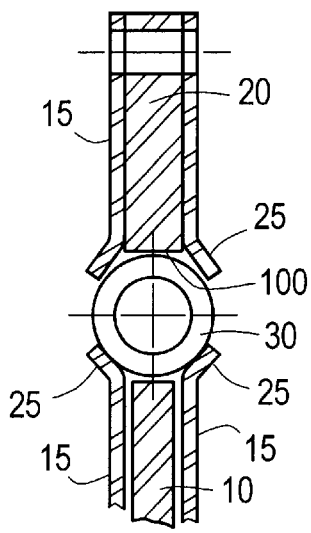
Figure 3D:
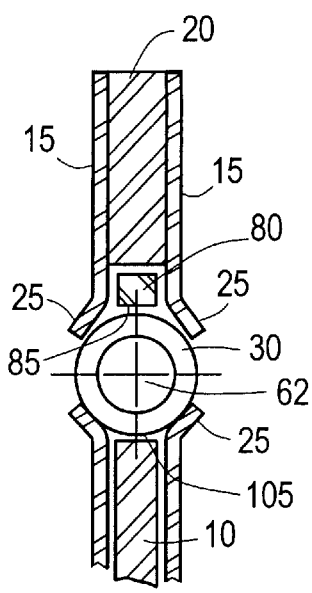
Figure 3A:
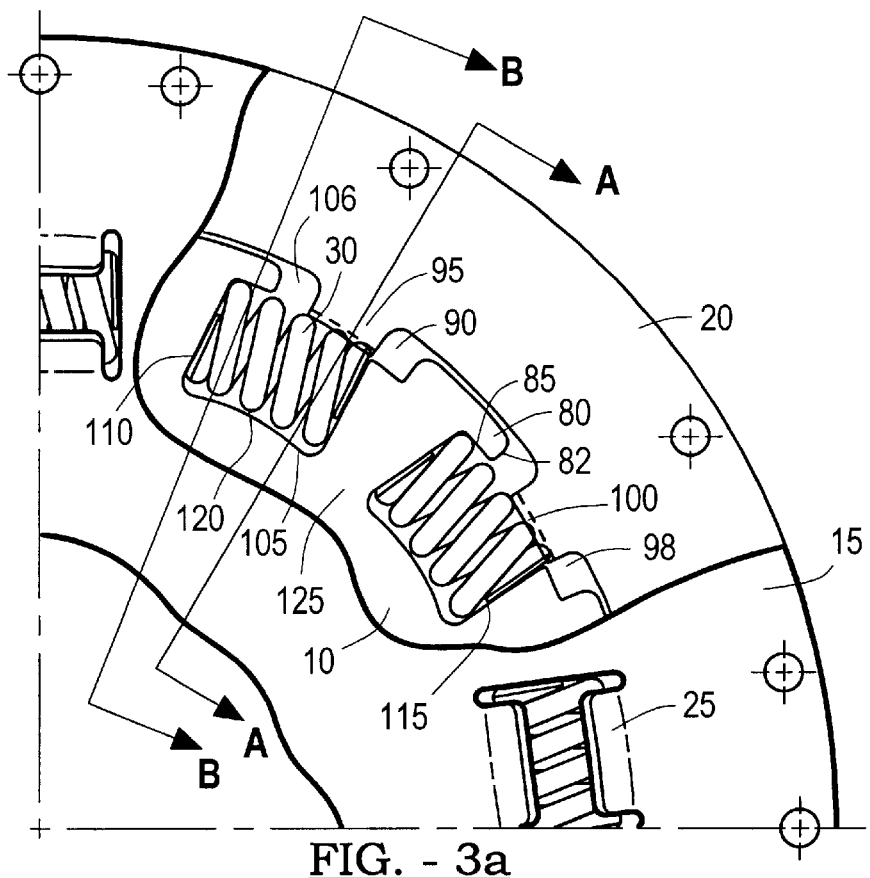

Depicted in FIG. 3a is another embodiment of the current invention. Depicted is a torsion damping apparatus having an output member 10, a pair of input members 15 being separated by the spacer ring 20. The output member has a plurality of teeth 125 defining a plurality of channels 120 therebetween. The channel 120 has a bottom wall 105, forward wall 110 and aft wall 115. The teeth 125 define a recess portion 90 and ledge portion 80. The ledge portion 80, which has a ledge bearing surface 85 in contact with forward wall 110 and ledge face 82, partially encloses channel 120. As with the previous embodiment, the input flanges 15 have a plurality of holding flanges 25, and forward 28 and aft 29 bearing surfaces.

Spacer ring 20 defines a spacer cavity 106 and has a plurality of platforms 95. Each platform has a platform bearing surface 100 which functions similarly to the bearing surface 75 of FIG. 2b. In the assembly's neutral position, the platform bearing surface 75 is disposed adjacent to the channel and in contact with spring member 30.

FIG. 3b is a cross-sectional view along line A—A of FIG. 3a. Depicted is output member 10, a pair of input members 15, and spacer bar 20. Shown is the spacer platform 95 and platform bearing surface 100. Platform bearing surface 100 is shown having a curved channel. It is preferred the curved channel has a diameter equal to the outside diameter of spring 30. As depicted in FIG. 3c, the platform bearing surface can also have a flat surface area or other geometric configurations. FIG. 3d is a cross-sectional view along line B—B of FIG. 3a. Depicted is output flange 10, a pair of input flanges 15 and spacer bar 20. Further depicted is the ledge portion 80 having the ledge bearing surface 85. As shown, spring 30 is positioned between the bottom wall 105 and the ledge bearing surface 85. As depicted in FIG. 3d the ledge bearing surface 85 can have a flat or curved surface. Spring 30 is also held between the plurality of holding flanges 25.

Figure 4A:
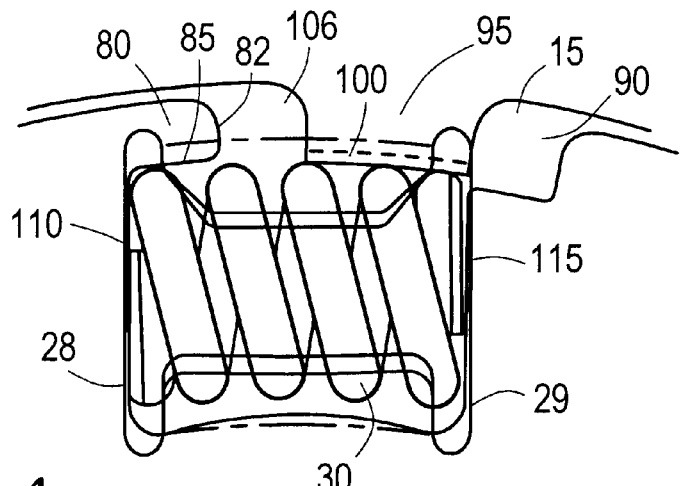
FIGS. 4a–4c depict actuation of the current invention under loading condition.
Figure 4B:
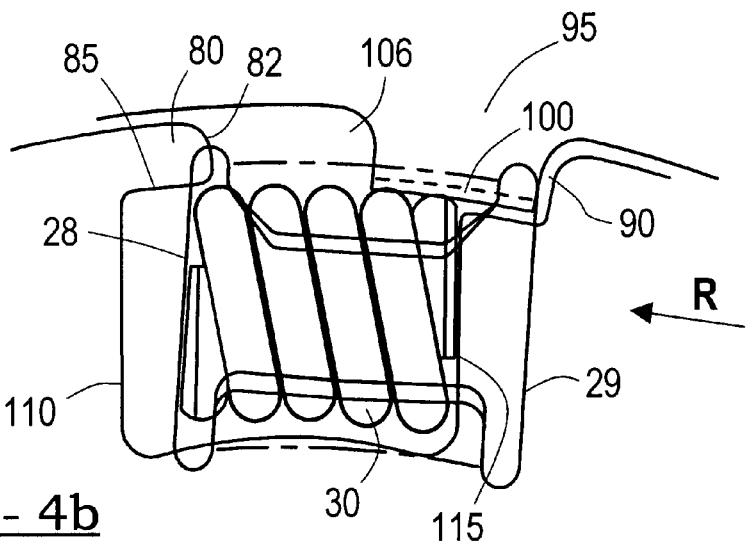
Figure 4C:
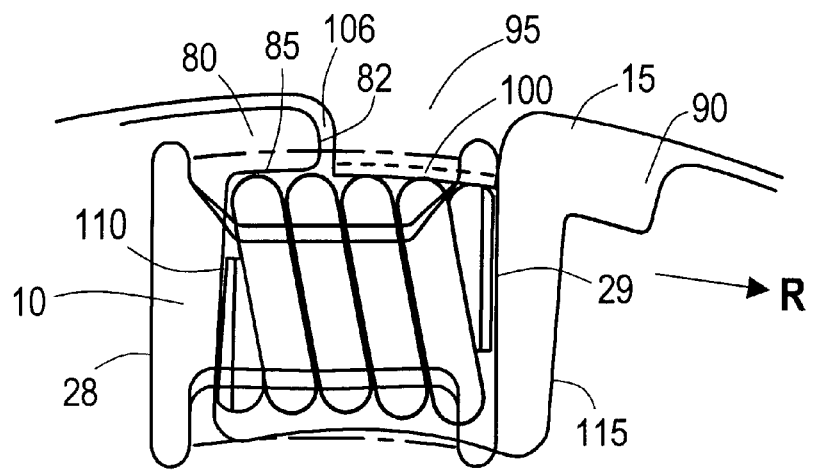

FIGS. 4a–4c depict the functioning of the current invention. FIG. 4a depicts the current embodiment in a neutral position. FIG. 4c depicts the current embodiment subject to torque in the preferred rotational direction. As can be seen, spring 30 is compressed between forward wall 110 and aft bearing surface 29. Platform 95 is rotated away from recess portion 90 toward the ledge 80. Bearing surfaces 85 and 100 translate across spring 30. The ledge portion 80 translates into spacer cavity 106. It must be noted that there is minimal relative movement between the ledge bearing surface 85 and the spring 30, reducing wear in this region.

As can be seen in FIG. 4b, torque has been applied to input member 10 in the rotational direction R causing a relative rotational displacement between input member 10 and output member 15. Spacer platform 95 is shown translated into recess portion 90. The spring member 30 is compressed between the forward bearing surface 28 and aft wall 115. As shown, the coved platform bearing surface 100 translates along the top of spring portions 30. Likewise, the ledge bearing surface 85 translates off the spring 30. It should be noted that the ledge bearing surface 85 can have a coved or flat structure (as depicted in FIG. 4b). The forces from the spring members 30 tend to align output member 10 with parallel input members 15.

Many changes and modifications in the above described embodiment of the invention can, of course, can be carried out without departing from the scope thereof. For instance, elements defined as input members can be used as output members as when the coupling system is used to join two engines. As such, element labels such as input and output members are interchangeable and are not intended to limit the uses of the dual functional elements. Accordingly, that scope is intended to be limited only by the scope of the appended claims.

What is claimed is:

1. A torsional vibration coupling comprising:

an input member having a pair of generally parallel plates and a spacer bar disposed between the plates, the spacer bar being fixedly coupled to the input member and having at least one spacer bar bearing surface;

an output member disposed between the plates;

the input and output members angularly movable with each other about a common axis and relative to each other from neutral positions;

at least one torsion damping member disposed between the input member and the output member;

the torsion damping members being in contact with the spacer bar bearing surface.

2. The torsional vibration coupling of claim 1, wherein the input member further comprises a plurality of channels, the torsional damping member being disposed therein.

3. The torsional vibration coupling of claim 1, wherein the spacer bar bearing surface is concave.

4. The torsional vibration coupling of claim 1, wherein the spacer bar is an annular ring.

5. The torsional vibration coupling of claim 1, wherein the output member further has a plurality of teeth;

a pair of teeth defining a channel;

the torsional damping members being disposed within the channel.

6. The torsional vibration coupling of claim 5, further comprising at least one layer of friction material disposed between the input and output members.

7. The torsional vibration coupling of claim 5, wherein the teeth further defines a ledge portion having a ledge bearing surface;

the ledge bearing surface being disposed over a portion of the channel;

the channel having a bottom surface;

the torsional dampening members being disposed between the ledge bearing surface and the bottom surface.

8. The torsional vibration coupling of claim 6, wherein the spacer bar further defines a spacer cavity and a spacer platform, the spacer bearing surface disposed on the spacer platform.

9. The torsional vibration coupling of claim 6, wherein the torsional damping member is further disposed between the spacer bar and the bottom surface.

10. The torsional vibration coupling of claim 6, wherein the torsional damping member is comprised of a helical spring.

11. The torsional vibration coupling of claim 7, wherein the torsion damping member is further in contact with the spacer bar bearing surface.

12. The torsional vibration coupling of claim 7, further comprising at least one layer of frictional material disposed between the input and output members.

13. The torsional vibration coupling of claim 10, wherein said output member further comprises a hub portion having a common axis with the input and output members;

and wherein said input members further define slots having a forward bearing surface and an aft bearing surface, the slots having a plurality of holding flanges coupled thereon, the slots being generally aligned with the channels.

14. The torsional vibration coupling of claim 13, wherein the helical springs are in contacting relationship with the forward and aft bearing surfaces.

15. A torsional vibration coupling, comprising:

an output flange;

a pair of input flanges defining a plurality of slots with holding flanges, and having an annular spacer bar being fixedly coupled to the input member and having a spacer bearing surface disposed therebetween;

the output flange defining a plurality of channels and being disposed between the pair of input flanges;

the channels being disposed generally adjacent the slots;

a plurality of helical coil springs being disposed within the channels and slots and in contact with the spacer bearing surface.

16. A torsional vibration coupling, comprising:

an output flange having a plurality of teeth;

each tooth having a ledge portion having a ledge bearing surface, each tooth pair defining a channel, having a bottom surface, the ledge portion being disposed over at least a portion of the channel;

a pair of input flanges defining a plurality of slots, each slot having at least one holding flange, the slots being generally adjacent the channels;

an annular spacer ring disposed between the input flanges having a spacer platform and spacer bearing surface; the annular spacer ring being fixedly coupled to one of the input flanges or the output flanges.

a plurality of coil springs disposed within the channel between the annular spacer bar and the output flange.

17. The torsional vibration coupling of claim 16, wherein the tooth further contains a recess portion and the coil springs are further disposed between the ledge bearing surface and the bottom surface.

18. The torsional vibration coupling of claim 17, wherein the coil spring is further in contact with the spacer bearing surface.

* * * * *